United States Patent [19]
Chenoweth

[11] Patent Number: 5,584,102
[45] Date of Patent: *Dec. 17, 1996

[54] LOCKING CLIP FOR REEL BAND

[75] Inventor: Dean B. Chenoweth, Minnetonka, Minn.

[73] Assignee: Advantek, Inc., Minnetonka, Minn.

[*] Notice: The term of this patent shall not extend beyond the expiration date of Pat. No. 5,460,268.

[21] Appl. No.: 450,851

[22] Filed: May 30, 1995

Related U.S. Application Data

[62] Division of Ser. No. 236,579, May 2, 1994, Pat. No. 5,460,268.

[51] Int. Cl.⁶ .................................................. B65D 85/02
[52] U.S. Cl. ................................................ 24/16 PB; 24/22
[58] Field of Search .................................. 24/20 R, 16 R, 24/16 PB, 21, 22, 23 R, 23 B, 23 EE, 20 EE; 206/53–55, 398–400

[56] References Cited

U.S. PATENT DOCUMENTS

| | | |
|---|---|---|
| 3,095,969 | 7/1963 | Morrison . |
| 3,287,777 | 11/1966 | Cranwill . |
| 3,311,228 | 3/1967 | Kulka . |
| 3,667,595 | 6/1972 | Posso . |
| 3,696,935 | 10/1972 | Dean . |
| 3,939,977 | 2/1976 | Price et al. . |
| 4,353,462 | 10/1982 | Polaneczky . |
| 4,388,991 | 6/1983 | Price . |
| 4,762,223 | 8/1988 | Posso . |
| 5,460,268 | 10/1995 | Chenoweth .................. 206/400 |

FOREIGN PATENT DOCUMENTS 1169301  9/1958  France .

*Primary Examiner*—James R. Brittain
*Attorney, Agent, or Firm*—Burd, Bartz & Gutenkauf

[57] ABSTRACT

A band has a pair of laterally spaced grooves adjacent its side edges accommodating the outer peripheral edges of a tape accommodating reel assembly. A connecting clip has first and second hook members projecting through corresponding openings in opposite ends of the band to hold the band on the reel assembly to enclose and protect a carrier tape stored on the reel assembly. The hook members and openings in the band are longitudinally aligned so that the band is held on the reel assembly in an end-to end relationship.

7 Claims, 3 Drawing Sheets

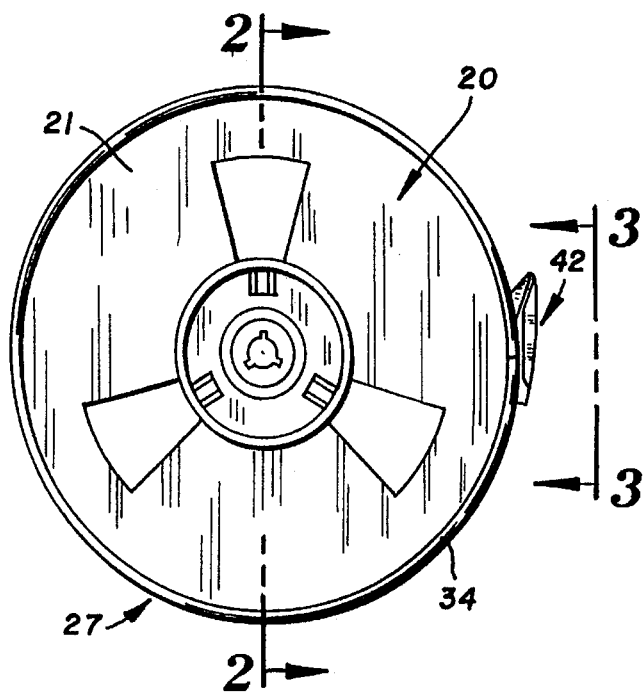
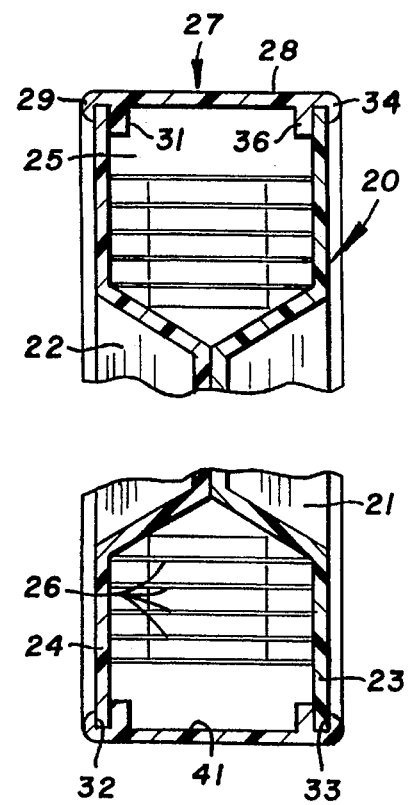
FIG.1
FIG.2
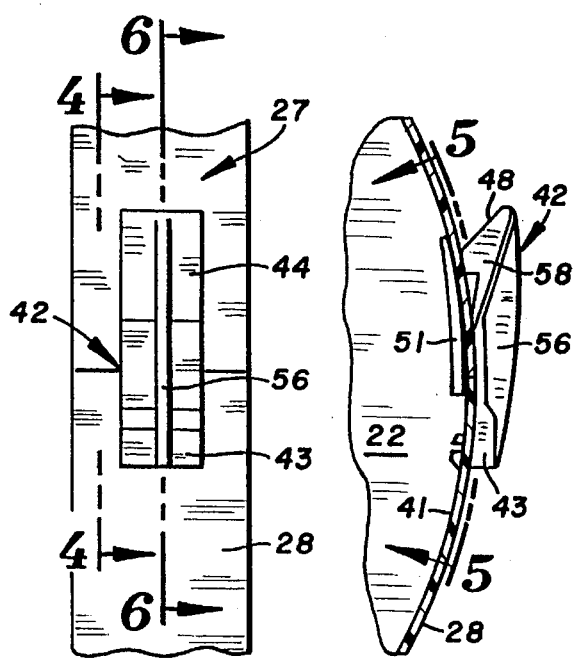
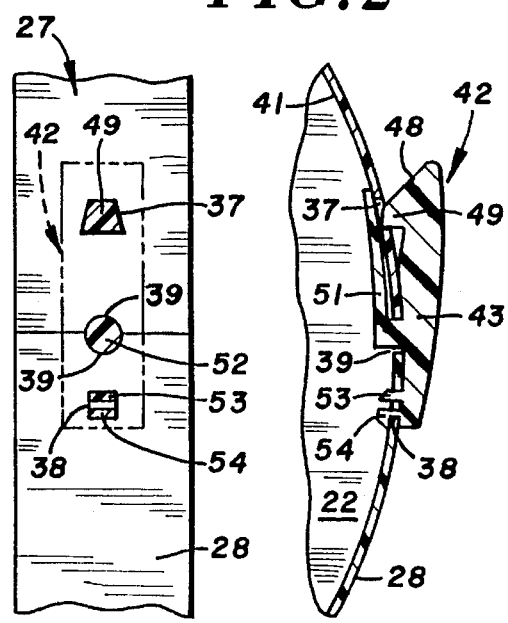
FIG.3  FIG.4  FIG.5  FIG.6

5,584,102

LOCKING CLIP FOR REEL BAND

This is a division of application Ser. No. 08/236,579, filed May 2, 1994 now U.S. Pat. No. 5,460,268.

FIELD OF THE INVENTION

The invention relates to packaging products used for protection of components packaged in tape and film storage structures. The packaging products are bands held on the outer peripheral edges of the circular side members of the storage structures with a clip member for storing and protecting a ribbon of flexible sheet material, such as tape and film.

BACKGROUND OF THE INVENTION

Tapes, films, and other elongated sheet members are commonly stored on reels. The reels have a central hub attached to outwardly directed circular side walls. Solid metal and plastic canisters or cases have been used to house the reels. The metal and plastic cases require substantial material to construct and are costly to manufacture. These cases are generally non-recyclable and have to be shipped back to the manufacturer at relatively high cost for reuse. Low cost disposable cases have been made with rectangular shaped cardboard paper containers. The paper tends to pick up dust and dirt and absorbs moisture. The prior art cases for tape accommodating reels are bulky and require considerable space for shipment and storage.

SUMMARY OF THE INVENTION

The invention is directed to a band apparatus for a reel assembly used in packaging of tape carrying components, such as electronic microchips. The band fits on the outer peripheral edges of the reel sections to enclose the tape wound on the reel assembly. A locking clip is used to releasably hold the band on the reel assembly. Use of the band eliminates shipping costs and reduces warehouse space requirements.

The band is an extruded member made of recyclable plastic material having a length substantially the same as the circumference of a reel assembly used in packaging of tape for carrying various electronic components. The band has downwardly directed flanges and ribs forming groove means that accommodate the outer peripheral edges of the reel sections. The locking clip releasably holds the ends of the band in assembled relation on the reel assembly. The band has at least two openings in longitudinal alignment located on opposing ends of the band that accommodate first and second hooks projecting from the bottom of the locking clip. The hooks cooperate to hold the band around the circumference of the reel assembly. The ends of the band have centrally located notches that surround a post member of the locking clip to position and hold the ends of the band in alignment. The locking clip has an inclined forward face that facilitates the placement of the clip on the band.

These and other features and advantages of the band assembly and locking clip are set out in the following disclosure and drawing.

DESCRIPTION OF THE DRAWING

FIG. 1 is a side elevational view of a reel assembly equipped with the band apparatus of the invention;

FIG. 2 is an enlarged foreshortened sectional view taken along the line 2—2 of FIG. 1;

FIG. 3 is a side elevational view of a portion of the left side of the band apparatus of FIG. 1 showing the connecting clip;

FIG. 4 is a sectional view taken along the line 4—4 of FIG. 3;

FIG. 5 is a sectional view taken along the line 5—5 of FIG. 4;

FIG. 6 is an enlarged sectional view taken along the line 6—6 of FIG. 3;

DESCRIPTION OF THE PREFERRED EMBODIMENT

Figure 7:
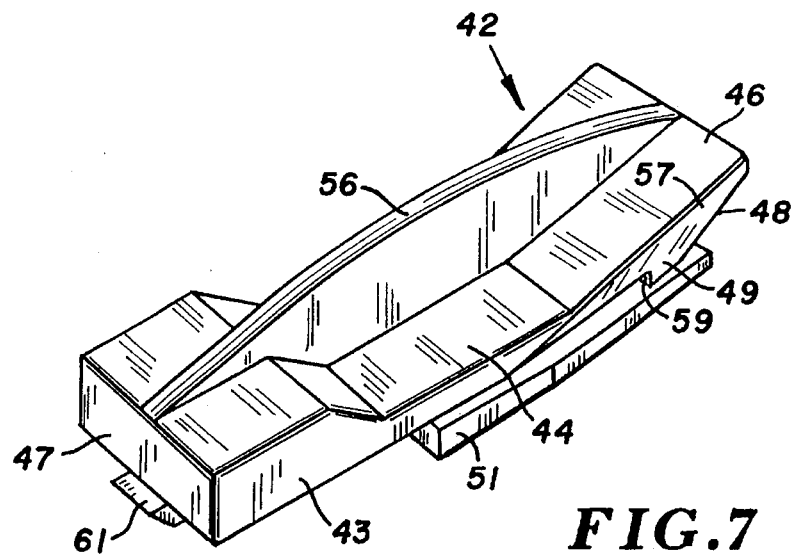
FIG. 7 is a perspective view of the connecting clip.
Figure 8:
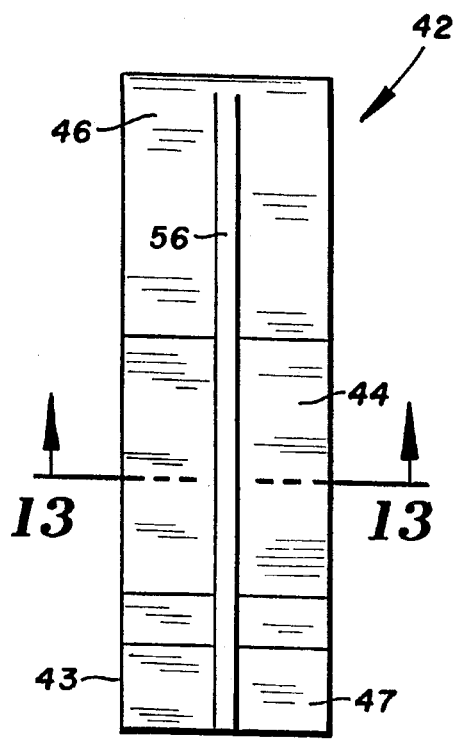
FIG. 8 is a top plan view of the clip of FIG. 7.

Referring to FIGS. 1 to 3, there is shown a band of the invention indicated generally at 27 for enclosing and protecting tape 26, such as film, tape, and like elongated ribbons, on a spool or reel assembly 20 used in the packaging of tape 26. Band 27 is mounted on the outer peripheral edges of reel assembly 20 to enclose tape 26 stored on reel assembly 20. A locking or connecting clip of the invention indicated generally at 42 is attachable to the each end of band 27 to releasably hold band 27 on reel assembly 20.

Tape 26 is an elongated ribbon of flexible sheet material, such as laminated sheet material, carrying a plurality of components, electronic microchips, and the like. Tape 26 has a plurality of recesses for storing the components. An example of a tape adapted to carry electronic components is disclosed by D. B. Chenoweth in U.S. Pat. No. 5,152,393.

Tape accommodating reel assembly 20 has a pair of one-piece plastic members or reel sections 21 and 22 that are interlocked together. Each reel section 21, 22 has a circular side wall 23, 24 surrounding a central hub. The hub has an inwardly directed wall joined to a base wall offset from side wall 23, 24 whereby side walls 23 and 24 of reel sections 21 and 22 are transversely spaced to form a chamber 25 which accommodates tape 26. Reel sections 21 and 22 can be made with hubs having different sizes, for example, 4 mm, 8 mm and 16 mm, so that the lateral dimension of chamber 25 can be varied to accommodate different widths of sheet material. One end of tape 26 is attached to the central hub of reel assembly 20 so that when reel assembly 20 is rotated, tape 26 is wound on reel assembly 20 for storage. An example of a tape reel assembly is disclosed by D. B. Chenoweth in U.S. Pat. No. 4,726,534.

As shown in FIG. 2, band 27 has a generally flat top wall 28 and a bottom wall 41. Each outer side edge 29, 34 of band 27 is turned inwardly generally normal to bottom wall 41. A pair of transversely spaced ribs 31 and 36 on bottom wall 41 extend longitudinally adjacent side edges 29 and 34 to define first and second longitudinal grooves 32 and 33, respectively. The lateral distance between ribs 31 is substantially equal to the lateral width of chamber 25. Ribs 31 and 36 are generally parallel to side edges 29 and 34. The outer peripheral edges of reel side walls 23 and 24 are located in grooves 32 and 33 with a sliding fit relation when band 27 is placed on reel assembly 20. This prevents slipping and lateral movement of band 27 relative to reel assembly 20. Band 27 has a length substantially the same as the outer circumference of reel assembly 20 whereby the opposite ends of band 27 are located in an end-to-end relation when band 27 is held on the outer periphery of reel assembly 20 with clip 42. The width of band 27 is slightly wider than the lateral dimension of reel assembly 20, as shown in FIG. 2. The additional width of band 27 relative to the lateral dimension of reel assembly 20 allows separation of reel assemblies stored in quantity. Band 27 can be constructed to have shorter or longer widths for use with reel assemblies having shorter or longer lateral dimensions than reel assembly 20.

Referring to FIGS. 5 and 6, band 27 has a first opening 37 adjacent one end of the band. A second opening 38 is located adjacent the opposite end of band 27. Each end of band 27 has a notch 39 located in the middle portion of the end. Openings 37 and 38 and notches 39 are longitudinally aligned, as shown in FIG. 5. The entire band 27 is a one-piece flexible, generally flat elongated plastic member. The plastic member is extrusion formed. This method of manufacture reduces the cost of making band 27. Others methods of manufacture can be used to make band 27.

Referring to FIGS. 7 to 13, clip 42 is a one-piece plastic member having a generally rectangular shaped body 43 with a top wall 44, front end 46 and rear end 47. A flat tab or brace 56 extends longitudinally from front end 46 to rear end 47 of clip body 43. Front end 46 of clip 42 has an inwardly inclined forward face 48 and inwardly inclined side faces 57 and 58 that converge into a trapezoidal shaped hook 49. Hook 49 is moved into band opening 37 which is similarly trapezoidal shaped to correspond with hook 49. Hook 49 has a generally flat transverse shoulder 59 that engages band 27 adjacent the outer portion of opening 37. Inclined forward face 48 facilitates the positioning of clip 42 on band 27.

Figure 9:
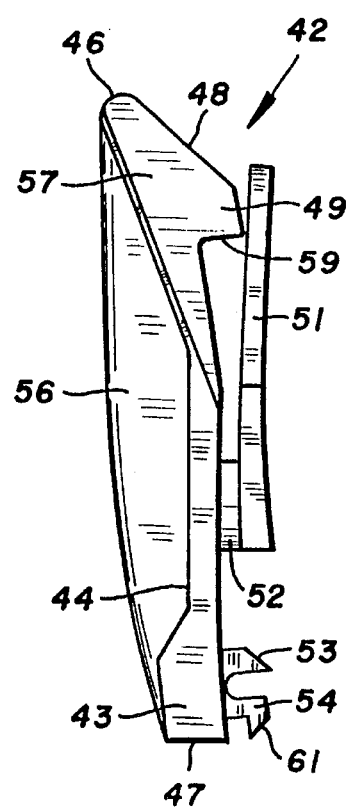
FIG. 9 is a side elevational view of the clip of FIG. 7.
Figure 10:
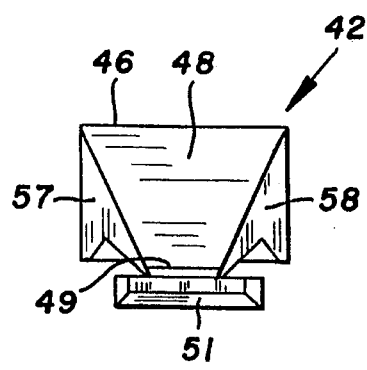
FIG. 10 is a front elevational view of the clip of FIG. 7.
Figure 11:
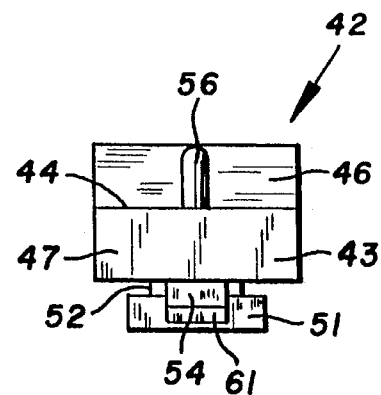
FIG. 11 is a rear elevational view of the clip of FIG. 7.
Figure 12:
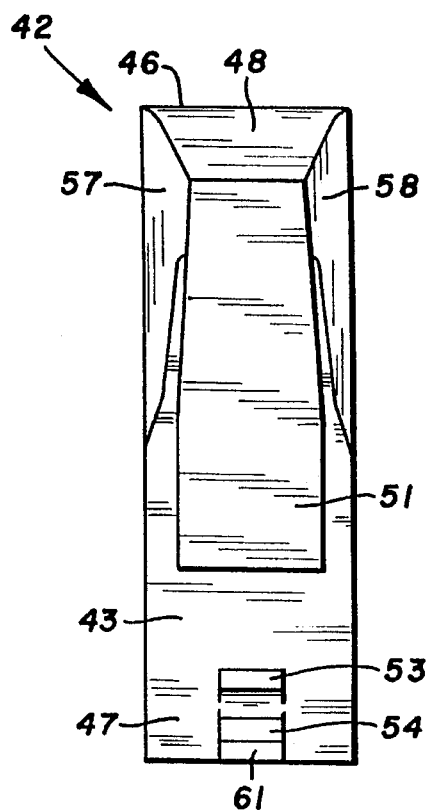
FIG. 12 is a bottom plan view of the clip of FIG. 7.
Figure 13:
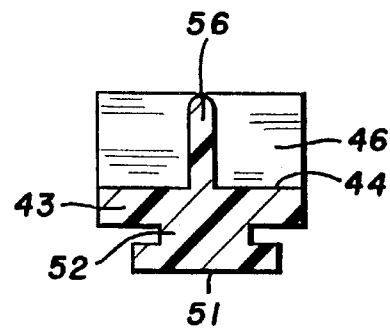
FIG. 13 is a sectional view taken along the line 13—13 of FIG. 8.

Rear end 47 of clip 42 has a wedge shaped projection 53 located adjacent a downwardly extending rear hook 54. Projection 53 and rear hook 54 form a generally rectangular shaped member which is moved into band opening 38 which is rectangular shaped to correspond with the rectangular shape of projection 53 and rear hook 54. Rear hook 54 has a transverse end portion 61 that projects outwardly through opening 38 and engages bottom surface 41 of band 27. Front hook 49, projection 53 and rear hook 54 of clip 42 cooperate with each other to hold band 27 on the outer periphery of reel assembly 20. As seen in FIG. 9, projection 53 is spaced from rear hook 54 whereby projection 53 and rear hook 54 can be moved toward each other to facilitate the insertion of projection 53 and rear hook 54 into opening 38. Projection 53 and rear hook 54 then return to their original positions after projection 53 and rear hook 54 are moved through opening 38.

A post 52 extends downwardly from the bottom of clip body 43 and is attached to a generally flat base or flange 51. Clip body 43 is longitudinally spaced from flange 51. As shown in FIGS. 4 and 6, clip body 43 is located adjacent top wall 28 of band 27 and flange 51 is located adjacent bottom wall 41 of band 27 when clip 42 is attached to band 27. Flange 51 is a semi-flexible member so it can bend and conform to the arcuate position of band 27 when band 27 is clipped on reel assembly 20 with clip 42. The separation between flange 51 and clip body 43 is approximately the same as the thickness of band 27 whereby band 27 has a friction fit with clip 42 between flange 51 and clip body 43. Flange 51 cooperates with hook 49 to hold clip 42 on the end of band 27. Notches 39 located in the middle portion of the ends of band 27 surround post 52 to align the ends of band 27 longitudinally, as shown in FIG. 5. Hook 49, post 52, projection 53, and rear hook 54 are longitudinally aligned, as shown in FIG. 5, to correspond with openings 37 and 38 and notches 39.

In use, reel sections 21 and 22 having selected hub sizes are snapped together to form reel assembly 20 useable to carry a selected sized tape 26. Reel assembly 20 is loaded with tape 26 carrying a plurality of components. Clip 42 is attached to one end of band 27 by forcing projection 53 and rear hook 54 through opening 38. The end portion of band 27 is placed on the outer peripheral edges of circular side walls 23 and 24 of reel sections 21 and 22. The remaining portion of band 27 is then guided around the circumference of reel assembly 20. Grooves 32 and 33 accommodate the outer peripheral edges of side walls 23 and 24 to hold band 27 on reel assembly 20. Front end 46 of clip 42 is fed over the opposite end of band 27 until hook 49 locks into opening 37 to attach band 27 in an end-to-end relation around reel assembly 20. Inclined forward face 48 of clip 42 causes the end of band 27 to slide down face 48 and between flange 51 and the bottom of clip body 43 to facilitate the positioning of forward end 46 of clip 42 on the end of band 27. Post 52 is located in notches 39 to align the first and second ends of band 27. Openings 37 and 38 and slots 39 are located in longitudinal alignment with hook 49, post 52, projection 53 and rear hook 54 whereby clip 42 holds band 27 in end to end relation on reel assembly 20 to enclose and protect tape 26 stored on reel assembly 20.

Reel sections 21 and 22 can be made with hubs having different sizes, for example, 4 mm, 8 mm and 16 mm, to make a reel assembly having a different lateral dimension to accommodate different widths of tape. Band 27 can have shorter or longer widths for use with these reel assemblies having shorter or longer lateral dimensions to enclose and protect the sheet material stored thereon.

While there has been shown and described a preferred embodiment of the band apparatus of the invention, it is understood that changes in materials, sizes, and shapes of the band apparatus may be made by those skilled in the art without departing from the invention. The invention is defined in the following claims.

I claim:

1. A locking clip for holding a band member on a reel assembly accommodating a ribbon of flexible sheet material, the band member having a first end and a second end opposite from the first end, the clip being attachable to each end of the band member to releasably retain the band member on the reel assembly to enclose and protect the ribbon of flexible sheet material stored thereon and prevent lateral shifting of the ends, comprising: a body having a top wall, bottom wall, front end and a back end, the front end having an inwardly inclined forward face and inwardly inclined side faces converging downwardly to define first hook means on the bottom wall, the back end having second hook means extended downwardly from the bottom wall opposite from the first hook means, a generally cylindrical member extending downwardly from the bottom wall of the body, and flange means connected to the cylindrical member extending toward the first hook means, the first and second hook means and the cylindrical member located in a longitudinal plane generally parallel to the bottom wall of the body, the flange means having a flat upper surface located parallel to the longitudinal plane adapted to cooperate with the first and second hook means, and cylindrical member.

2. The locking clip of claim 1 wherein: the first hook means has a generally flat transverse shoulder.

3. The locking clip of claim 1 wherein: the first hook means is adapted to project through an opening in the first end of the band, the second hook means is adapted to project through an opening in the second end of the band member to hold the first and second ends of the band member together.

4. The locking clip of claim 1 wherein: the forward face and side faces of the front end terminate in a lower surface, the flange means comprising a generally flat semi-flexible flange member having a forward end closely adjacent the lower surface.

5. A locking clip for releasable attachment to opposite ends of a band member to prevent lateral shifting of the ends of the band member comprising: a body having a bottom wall, first end and a second end, the first end having first means extending downwardly from the bottom wall, the second end having second means opposite from the first means, an inclined face extending inwardly from the first end to the first means, a cylindrical member extending downwardly from the bottom wall located between the first and second means, and flange means connected to the cylindrical member extending laterally from the cylindrical member toward the first means, the flange means having a forward end closely adjacent the first means.

6. The locking clip of claim 5 wherein: the first and second means and the cylindrical member are located in a longitudinal plane generally parallel to the bottom wall of the body.

7. The locking clip of claim 5 wherein: the flange means comprises a generally flat semi-flexible member.

* * * * *